(12) United States Patent
Wei et al.

(10) Patent No.: US 10,137,717 B2
(45) Date of Patent: Nov. 27, 2018

(54) LASER PRINTING APPARATUS AND METHOD FOR COLOUR DYNAMIC IMAGE

(71) Applicants: SVG Optronics, Co., Ltd., Jiangsu (CN); Soochow University, Jiangsu (CN)

(72) Inventors: Guojun Wei, Jiangsu (CN); Linsen Chen, Jiangsu (CN); Pengfei Zhu, Jiangsu (CN); Donglin Pu, Jiangsu (CN); Zhifei Zhu, Jiangsu (CN); Heng Li, Jiangsu (CN)

(73) Assignees: SVG OPTRONICS CO., LTD., Suzhou, Jiangsu (CN); SOOCHOW UNIVERSITY, Suzhou, Jiangsu (CN)

( * ) Notice: Subject to any disclaimer, the term of this patent is extended or adjusted under 35 U.S.C. 154(b) by 0 days.

(21) Appl. No.: 15/507,737

(22) PCT Filed: Mar. 30, 2015

(86) PCT No.: PCT/CN2015/075381
§ 371 (c)(1),
(2) Date: Feb. 28, 2017

(87) PCT Pub. No.: WO2016/033964
PCT Pub. Date: Mar. 10, 2016

(65) Prior Publication Data
US 2017/0291441 A1   Oct. 12, 2017

(30) Foreign Application Priority Data
Sep. 4, 2014   (CN) .......................... 2014 1 0448548

(51) Int. Cl.
*B41M 3/14* (2006.01)
*G02B 5/128* (2006.01)
(Continued)

(52) U.S. Cl.
CPC .............. *B41M 3/148* (2013.01); *B41J 2/442* (2013.01); *B41M 5/267* (2013.01); *G02B 3/0056* (2013.01); *G02B 5/128* (2013.01)

(58) Field of Classification Search
CPC ........ B41J 2/442; G02B 3/0056; B41M 3/148
See application file for complete search history.

(56) References Cited

U.S. PATENT DOCUMENTS 6,237,264 B1   5/2001   Gulick, Jr.
6,288,842 B1   9/2001   Florczak et al.
(Continued)

FOREIGN PATENT DOCUMENTS

CN   1159598 A   9/1997
CN   1452726 A   10/2003
(Continued)

OTHER PUBLICATIONS

State Intellectual Property Office as the International Searching Authority, International Search Report and Written Opinion for PCT Application No. PCT/CN2015/075381, dated Jun. 3, 2015.

*Primary Examiner* — Geoffrey Mruk
*Assistant Examiner* — Scott A Richmond
(74) *Attorney, Agent, or Firm* — Honigman Miller Schwartz and Cohn LLP; Matthew H. Szalach; Jonathan P. O'Brien

(57) ABSTRACT

A laser printing apparatus and method for a color dynamic image are provided. The laser printing apparatus includes an optical system and a recording material; the recording material includes a refraction layer formed by multiple microspheres or microlenses, and a shading layer formed on a focal plane of the multiple microshperes or microlenses; the optical system includes a laser and an graph generator, a laser light emitted by the laser irradiates onto the recording material after being processed by the image generator, the laser light irradiating onto the recording material is focused (Continued)

on the shading layer via the refraction layer, and a focus point is formed on the shading layer when energy of the focused laser light is greater than an evaporation threshold value of the shading layer.

8 Claims, 5 Drawing Sheets

(51) Int. Cl.
    *B41M 5/26*     (2006.01)
    *B41J 2/44*     (2006.01)
    *G02B 3/00*     (2006.01)

(56) References Cited

U.S. PATENT DOCUMENTS

2007/0258149 A1* 11/2007 Gardner ............... G02B 3/0056
    359/626
2010/0182666 A1* 7/2010 Herbert .............. G02B 27/2214
    359/200.7

FOREIGN PATENT DOCUMENTS

| CN | 1907726 A | 2/2007 |
|---|---|---|
| CN | 101802653 A | 8/2010 |
| CN | 102692660 A | 9/2012 |
| CN | 103317229 A | 9/2013 |
| CN | 103383492 A | 11/2013 |
| CN | 104191825 A | 12/2014 |
| JP | 4817989 B2 | 11/2011 |

* cited by examiner

LASER PRINTING APPARATUS AND METHOD FOR COLOUR DYNAMIC IMAGE

CROSS REFERENCE TO RELATED APPLICATIONS

This application is the national phase of International Patent Application No. PCT/CN2015/075381, titled "LASER PRINTING APPARATUS AND METHOD FOR COLOUR DYNAMIC IMAGE", filed on Mar. 30, 2015, which claims priority to Chinese Patent Application No. 201410448548.2, titled "LASER PRINTING APPARATUS AND METHOD FOR COLOUR DYNAMIC IMAGE", filed with the Chinese State Intellectual Property Office on Sep. 4, 2014, both of which are incorporated by reference in their entireties herein.

FIELD

The present disclosure relates to the technical field of laser printing, and in particular to a laser printing apparatus for a color dynamic image and a corresponding laser printing method.

BACKGROUND

With the microlens array imaging technology, dynamic imaging and three-dimensional imaging can be achieved. Firstly, a microlens array layer is attached on a laser recording material. Then, a projection imaging system generates an image over the microlens array, and the microlens array images on a recording material below a lower focal plane of the microlenses. The recorded information is reproduced by the microlens array in a space. The reproduced image has a dynamic effect as a viewing position changes.

In a conventional laser marking technology, an image or text may be ablated on surfaces of various substrates through a photothermal effect of a laser focus point. Such image or text is planar and has no dynamic effect. Moreover, the ablated image is generally gray or black. Therefore, although an integrated image can be printed with a dynamic effect by combining the laser marking technology and the microlens array, the reproduced image has no color and hence can not be a color image.

Therefore, it is desired to provide a further solution to solve the above problem.

SUMMARY

In view of the above, the present disclosure provides a laser printing apparatus for a color dynamic image and a corresponding laser printing method.

In order to achieve the above object, the present disclosure provides a laser printing apparatus for a color dynamic image. The laser printing apparatus for a color dynamic image includes: an optical system and a recording material, where the recording material includes a refraction layer formed by multiple microspheres or microlenses, and a shading layer formed on a focal plane of the multiple microspheres or microlenses; and the optical system includes a laser and a graph generator, a laser light emitted by the laser irradiates onto the recording material after being processed by the image generator, the laser light irradiating onto the recording material is focused on the shading layer via the refraction layer, and a focus point is formed on the shading layer when energy of the focused laser light is greater than an evaporation threshold value of the shading layer.

As an improvement of the laser printing apparatus for a color dynamic image according to the present disclosure, a size of each of the multiple microspheres or microlenses may be in a range of 20 um to 300 um, and a size of the shading layer may be in a range of 20 nm to 60 nm.

As an improvement of the laser printing apparatus for a color dynamic image according to the present disclosure, the image generator in the optical system includes an oscillating mirror unit and a diffuser sheet, the oscillating mirror unit is arranged on a light path of the laser light emitted by the laser, and is configured to receive the laser light emitted by the laser and transmit the received laser light to the diffuser sheet, and the refraction layer of the recording material is arranged opposite to a light-egress side of the diffuser sheet and is configured to receive an expanded laser beam emitted by the diffuser sheet.

As an improvement of the laser printing apparatus for a color dynamic image according to the present disclosure, the laser printing apparatus for a color dynamic image may further include an imaging lens group arranged on a light path between the diffuser sheet and the recording material.

As an improvement of the laser printing apparatus for a color dynamic image according to the present disclosure, the optical system may further include a prism unit arranged on a light path between the oscillating mirror unit and the diffuser sheet.

As an improvement of the laser printing apparatus for a color dynamic image according to the present disclosure, the image generator may include a mask having a light-transmission region forming a corresponding printing graph.

As an improvement of the laser printing apparatus for a color dynamic image according to the present disclosure, the laser printing apparatus for a color dynamic image may further include a pigment box and a pigment box moving assembly, the pigment box is arranged opposite to an aluminum film shading layer of the recording material, and the pigment box moving assembly is configured to drive the pigment box to move.

In order to achieve the above object, the present disclosure further provides a laser printing method for a color dynamic image. The laser printing method for a color dynamic image includes:

S1, emitting a laser light and processing the emitted laser light to form a corresponding image;

S2, performing beam-expansion on the laser light forming the corresponding image, where the laser light irradiates onto a refraction layer of a recording material after the beam-expansion;

S3, focusing the laser light on a shading layer via the refraction layer, where multiple via holes are formed on the shading layer under the focusing effect of the laser light;

S4, filling pigment into the via holes formed in step S3; and

S5, changing an incident direction of the emitted laser light and repeating the steps S1-S4 until a color dynamic image is formed.

As an improvement of the laser printing method for a color dynamic image according to the present disclosure, the step S4 may include: arranging a pigment box and a pigment box moving assembly against the shading layer of the recording material, driving, by the pigment box moving assembly, the pigment box to move to a location corresponding to the formed via holes on the shading layer, and filling the pigment into the via holes by means of sublimation.

As an improvement of the laser printing method for a color dynamic image according to the present disclosure, in the step S4, the pigment may be filled into the via holes formed in the step S3 by means of coating.

As compared with the conventional technologies, the present disclosure has the following advantages. The recording material in the present disclosure can record parallax graphs of an image in different angles in a same region. When reproducing the graphs after pigment is filled in, the reproduced graphs may be viewed in different colors at different viewing positions of corresponding angles of view.

The laser printing apparatus for a color dynamic image according to the present disclosure deflects an incident angle of a laser beam, and forms laser focus points at different locations on a focal plane of the recording material, so as to achieve thermal accumulation of different pigments. Multi-channel color graphs are laser-printed by repeating the deflection of the incident angle, thereby finally reproducing a color multi-channel dynamic image.

BRIEF DESCRIPTION OF THE DRAWINGS

The drawings are provided for better understanding the present disclosure and constitute a part of the specification, which are presented with embodiments for illustrating rather than limiting. In the drawings.

DETAILED DESCRIPTION OF EMBODIMENTS

The technical solution according to the embodiments of the present disclosure will be described in detail as follows. It is apparent that the described embodiments are only a few rather than all of the embodiments. Any other embodiments obtained by those skilled in the art based on the embodiments in the present disclosure without any creative work fall in the scope of the present disclosure.

The present disclosure is based on a recording material applied in laser printing of a color dynamic image. The recording material includes a refraction layer formed by multiple microspheres or microlenses and a shading layer formed on a focal plane of the multiple microspheres or microlenses. The multiple microspheres or microlenses may be arranged in an array form or in an irregular form.

Figure 1:
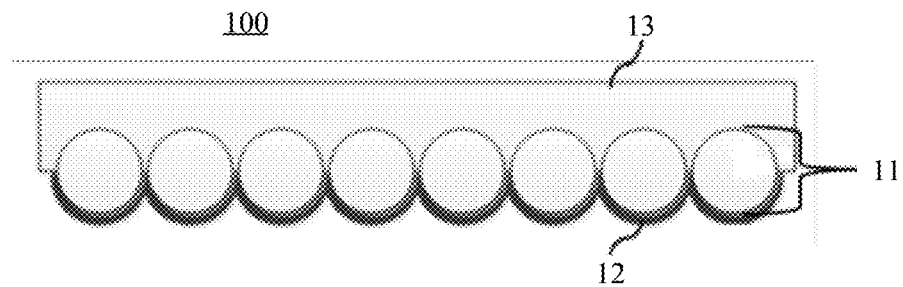
FIG. 1 is a schematic plan view of a recording material in which a refraction layer is formed by multiple microspheres according to the present disclosure.

FIG. 1 is a schematic plan view of a recording material in which a refraction layer is formed by multiple microspheres. In this case, a recording material 100 includes a refraction layer 11 and a shading layer 12, and the shading layer 12 is formed on a focal plane of the multiple microspheres. In the embodiment, the other side of the multiple microspheres is covered with a film 13, to support and fix the multiple microspheres.

Figure 2:
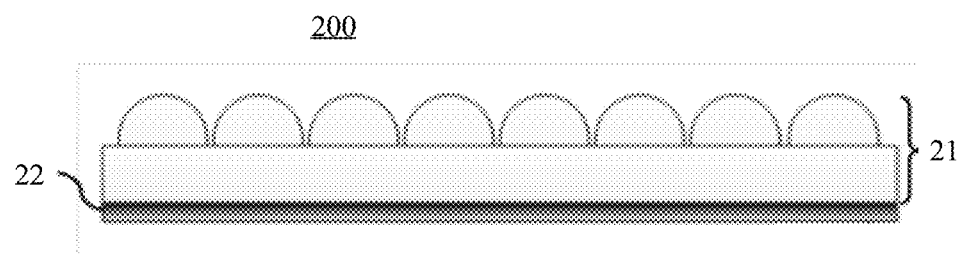
FIG. 2 is a schematic plan view of a recording material in which a refraction layer is formed by multiple microlenses according to the present disclosure.

FIG. 2 is a schematic plan view of a recording material in which a refraction layer is formed by multiple microlenses. In this case, a recording material 200 includes a refraction layer 21 and a shading layer 22 formed on a focal plane of the multiple microlenses.

Preferably, the shading layer may be made of aluminum. The aluminum shading layer may be formed on the focal plane of the multiple microspheres or microlenses by means of evaporation.

A size of the shading layer is in a range of 20 nm to 60 nm, and a size of each of the multiple microspheres or microlenses is in a range of 20 um to 300 um.

The refraction layer formed by the multiple microspheres or microlenses may deflect and focus an incident light. The recording material functions based on a spatial imaging principle of the multiple microspheres or microlenses, which is described as follows in conjunction with the drawings.

Figure 3:
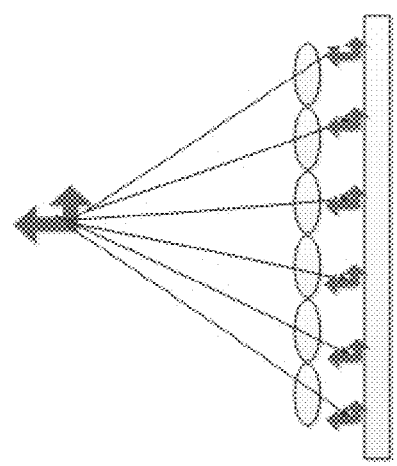
FIG. 3 is a schematic diagram of a spatial imaging principle of multiple microspheres or microlens.
Figure 4:
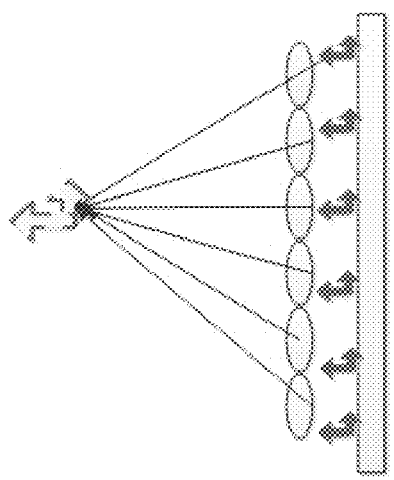
FIG. 4 is a schematic diagram of a spatial imaging principle of multiple microspheres or microlens.

FIGS. 3 and 4 are schematic diagrams of spatial imaging principles of the multiple microspheres or microlenses.

A microsphere or microlens array is arranged between a substrate and an object. Each microsphere or each microlens of the microsphere or microlens array images or partially images the object and records on the substrate. In reproduction, the microspheres or microlenses reproduce in an integrated manner, to show a reproduced graph at an original location of the object. If an observer changes an observing angle a little, the reproduced graph moves slightly due to a deflection effect of the microshperes or microlenses. In this way, a dynamic floating reproduced graph is presented over the substrate.

Figure 5:
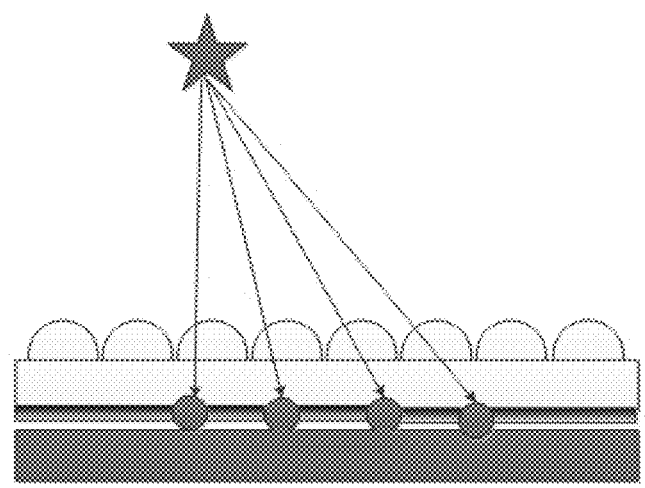
FIG. 5 is a schematic diagram showing that a recording material having a refraction layer formed by multiple microlenses records a graph under a condition of a first angle of view.
Figure 6:
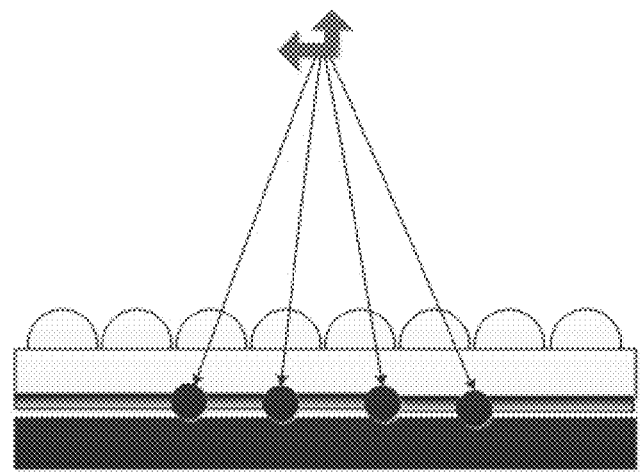
FIG. 6 is a schematic diagram showing that a recording material having a refraction layer formed by multiple microlenses records a graph under a condition of a second angle of view.
Figure 7:
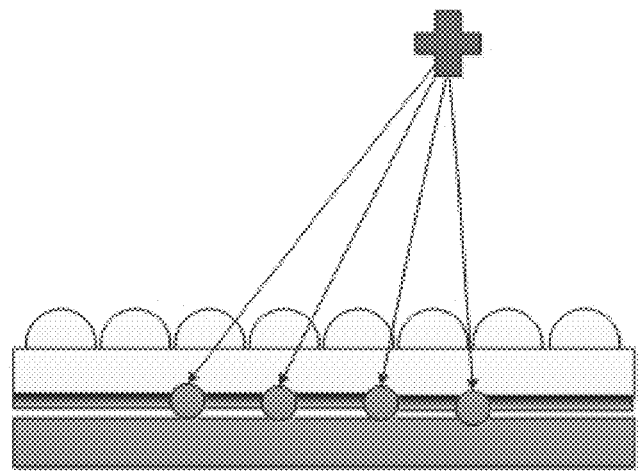
FIG. 7 is a schematic diagram showing that a recording material having a refraction layer formed by multiple microlenses records a graph under a condition of a third angle of view.

Reference is made to FIG. 5 to FIG. 7. FIG. 5 is a schematic diagram showing that a recording material having a refraction layer formed by multiple microlenses records a graph under a condition of a first angle of view. FIG. 6 is a schematic diagram showing that a recording material having a refraction layer formed by multiple microlenses records a graph under a condition of a second angle of view. FIG. 7 is a schematic diagram showing that a recording material having a refraction layer formed by multiple microlenses records a graph under a condition of a third angle of view. In FIGS. 5 to 7, a pigment box is arranged below the recording material.

Based on the above imaging principle, under the condition of the first angle of view, the laser light is deflected and forms a focus when passing through the refraction layer. Since the shading layer is arranged on a focal plane of the multiple microlenses in the refraction layer, light at a focus point formed by focusing the laser light irradiates onto the shading layer. By adjusting power of the laser light, the shading layer is burned through so as to form a via hole when energy of the laser light at the focus point is greater than an evaporation threshold value of the shading layer. An image corresponding to a current incident angle may be recorded by filling pigment into the via hole. In the case that the incident angle of the laser light is changed to be under the condition of the second angle of view, due to the recording parallax, the focus point of the laser light moves slightly and via holes are formed at corresponding locations. The above step of filling the pigment is performed again to record an image corresponding to the current incident angle. The incident angle of the laser light is continuously changed until a color dynamic image is laser-printed. In reproduction, reproduced graphs may be viewed with different colors at different viewing positions.

Figure 8:
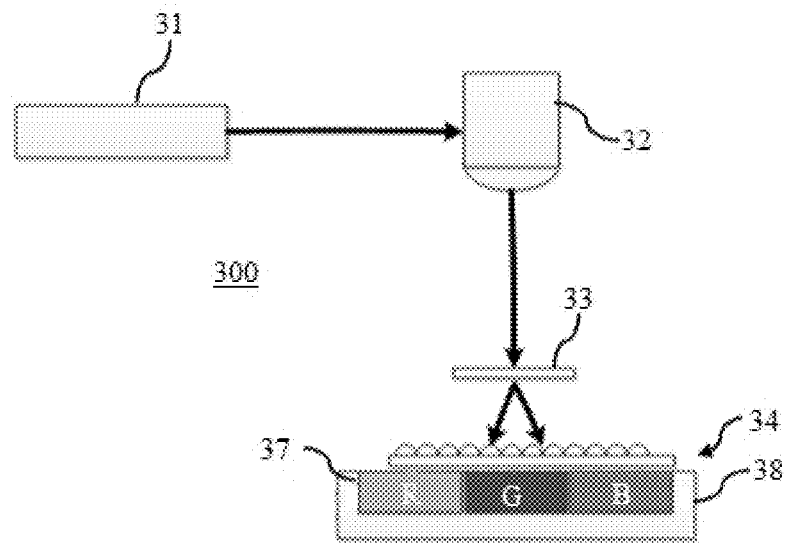
FIG. 8 is a schematic plan view of a laser printing apparatus for a color dynamic image according to an embodiment of the present disclosure.

As shown in FIG. 8, based on the above recording material, the present disclosure further provides a laser printing apparatus for a color dynamic image. The laser printing apparatus 300 for a color dynamic image includes an optical system and a recording material 34. The optical system includes a laser 31 and a graph generator. In this case, a laser light emitted by the laser irradiates onto the recording material after being processed by the image generator. The laser light irradiating onto the recording material is focused on a shading layer via a refraction layer. A focus point is formed on the shading layer when the energy of the focused laser light is greater than an evaporation threshold value of the shading layer.

In the embodiment, the graph generator includes an oscillating mirror unit 32 and a diffuser sheet 33. A laser light emitted by the laser 31 arrives on the recording material 34 successively through the oscillating mirror unit 32 and the diffuser sheet 33. The oscillating mirror unit 32 is arranged on a light path of the laser light emitted by the laser 31. The oscillating mirror unit 32 is configured to receive a laser light having a certain incident angle and emitted by the laser 31 and control the received laser light to form a graph. The laser light forming the graph is transmitted to the diffuser sheet 33 for beam-expansion. Further, the refraction layer of the recording material 34 is arranged opposite to a light-egress side of the diffuser sheet 33 to receive an expanded laser beam emitted by the diffuser sheet 33. After receiving the laser light, the recording material 34 focuses the laser light through the refraction layer thereof, to form via holes on the shading layer.

The above oscillating mirror unit 31 may be an F-THETA oscillating mirror unit. In order to improve a resolution of a recorded graph, a wavelength of the emitted laser light may be 532 nm, or may be 1064 nm or 351 nm.

Figure 9:
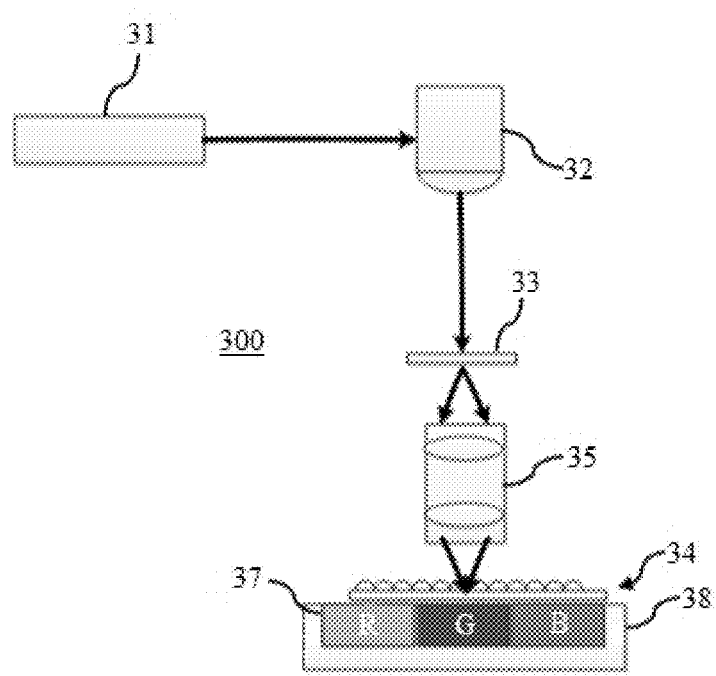
FIG. 9 is a schematic plan view of a laser printing apparatus for a color dynamic image according to another embodiment of the present disclosure.

As shown in FIG. 9, the optical system may further include an imaging lens group 35 arranged on a light path between the diffuser sheet and the recording material. The imaging lens group 35 collects the laser light beam-expanded by the diffuser sheet 33 and focuses the laser light on a lower surface of the recording material 34 to form a subsidence graph.

Figure 10:
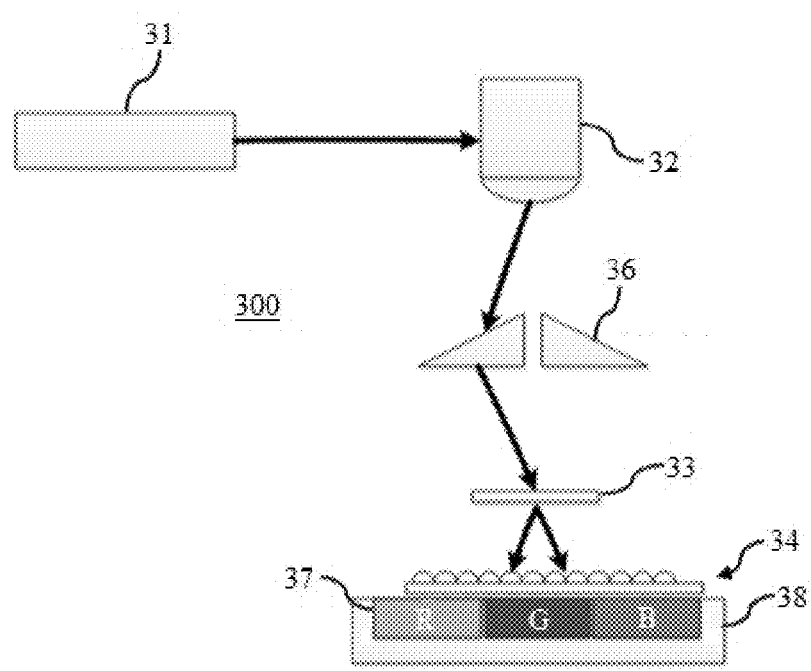
FIG. 10 is a schematic plan view of a laser printing apparatus for a color dynamic image according to another embodiment of the present disclosure.

As shown in FIG. 10, in order to adjust the incident angle of the laser light, the optical system may further include a prism unit 36 arranged on a light path between the oscillating mirror unit 32 and the diffuser sheet 33. The prism unit 36 may refract an incident laser light, thereby adjusting the incident angle.

Alternatively, the image generator may include a mask having a light-transmission region forming a corresponding printing graph. In this case, after passing through the mask, the laser light emitted by the laser forms a corresponding graph which is irradiated onto the recording material.

Further, in order to fill pigment into the via holes on the shading layer of the recording material 34, the laser printing apparatus 300 for a color dynamic image may further include a pigment box 37 and a pigment box moving assembly 38. The pigment box 37 is arranged opposite to and against the aluminum film shading layer of the recording material 34. The pigment box 37 contains pigments for filling the via holes. The pigment box moving assembly 38 may drive the pigment box 37 to move to a location based on the incident angle of the laser light, and the pigment may sublimate under the irradiation of the laser light and aggregate in a via hole at the location, thereby forming a color focus point. The pigment box moving assembly 38 may be a stepper motor or a servo motor.

The present disclosure further provides a laser printing method for a color dynamic image based on the above recording material. The laser printing method for a color dynamic image includes steps S1 to S5.

In step S1, a laser light is emitted, and the emitted laser light is processed to form a corresponding image.

In step S2, beam-expansion is performed on the laser light forming the corresponding image, where the laser light irradiates onto a refraction layer of a recording material after the beam-expansion.

In step S3, the laser light is focused on a shading layer via the refraction layer, where multiple via holes are formed on the shading layer under the focusing effect of the laser light.

In step S4, pigment is filled into the via holes formed in step S3.

In step S5, an incident direction of the emitted laser light is changed and the steps S1-S4 are repeated until a color dynamic image is formed.

In step S4, the pigment may be filled into the via holes by means of a pigment box, or may be filled into the via holes formed in step S3 by means of coating.

In the case of filling pigment by means of the pigment box, a pigment box and a pigment box moving assembly are arranged against the shading layer of the recording material. The pigment box moving assembly drives the pigment box to move to a location corresponding to the via holes formed on the shading layer, and three types of pigments R, G and B are successively filled into corresponding via holes by means of pigment sublimation.

Besides, after a color dynamic image is laser-printed, in order to enhance a color effect of a reproduced image, an aluminum layer may be further added as a refraction layer by means of evaporation, thereby enhancing the color effect.

In summary, the recording material according to the present disclosure can record parallax graphs of an image in different angles at a same location region. In reproducing after the pigment is filled, the reproduced graph may be viewed with different colors at different viewing positions of corresponding angles of view.

The laser printing apparatus for a color dynamic image according to the present disclosure deflects an incident angle of a laser beam, and forms laser focus points at different locations on a focal plane of the recording material, so as to achieve thermal accumulation of different pigments. Multi-channel color graphs are laser-printed by repeating the deflection of the incident angle, thereby finally reproducing a color multi-channel dynamic image.

It is evident to those skilled in the art that the present disclosure is not limited to the details of the foregoing illustrative embodiments, and that the present disclosure may be embodied in other specific forms without departing from the spirit or essential attributes thereof. The embodiments are therefore to be considered in all respects as illustrative and not restrictive. The scope of the present disclosure is defined by the appended claims rather than the foregoing description, and all changes which come within the meaning and range of equivalency of the claims are therefore intended to be covered.

Furthermore, it should be understood that, the present specification is described with embodiments only for clarity, and not all of the embodiments only contain one independent technical solution. Those skilled in the art should consider the specification as a whole, and the technical solutions of the embodiments may be appropriately combined to obtain other embodiments understandable to those skilled in the art.

The invention claimed is:

1. A laser printing apparatus for a color dynamic image, comprising:
   an optical system
   a recording material;
   a pigment box: and
   a pigment box moving assembly, wherein:
   the recording material comprises: a refraction layer formed by a plurality of microspheres or microlenses, and a shading layer formed on a focal plane of the plurality of microspheres or microlenses;
   the optical system comprises a laser and an image generator, a laser light emitted by the laser irradiates onto the recording material after being processed by the image generator, the laser light irradiating onto the recording material is focused on the shading layer via the refraction layer, and a focus point is formed on the shading layer when energy of the focused laser light is greater than an evaporation threshold value of the shading layer; and
   the pigment box is arranged opposite to the shading layer of the recording material, and the pigment box moving assembly is configured to drive the pigment box to move.

2. The laser printing apparatus for a color dynamic image according to claim 1, wherein a size of each of the plurality of microspheres or microlenses is in a range of 20 um to 300 um, and a size of the shading layer is in a range of 20 nm to 60 nm.

3. The laser printing apparatus for a color dynamic image according to claim 1, further comprising an imaging lens group arranged on a light path between a diffuser sheet and the recording material.

4. The laser printing apparatus for a color dynamic image according to claim 1, wherein the image generator comprises a mask having a light-transmission region forming a corresponding printing graph.

5. A laser printing apparatus for a color dynamic image, comprising:
   an optical system; and
   a recording material, wherein
   the recording material comprises: a refraction layer formed by a plurality of microspheres or microlenses, and a shading layer formed on a focal plane of the plurality of microspheres or microlenses;
   the optical system comprises a laser, an image generator, and a prism unit;
   a laser light emitted by the laser irradiates onto the recording material after being processed by the image generator, the laser light irradiating onto the recording material is focused on the shading layer via the refraction layer, and a focus point is formed on the shading layer when energy of the focused laser light is greater than an evaporation threshold value of the shading layer;
   the image generator in the optical system comprises an oscillating mirror unit and a diffuser sheet, the oscillating mirror unit is arranged on a light path of the laser light emitted by the laser and is configured to receive the laser light emitted by the laser and transmit the received laser light to the diffuser sheet, and the refraction layer of the recording material is arranged opposite to a light-egress side of the diffuser sheet and is configured to receive an expanded laser beam emitted by the diffuser sheet; and
   the prism unit is arranged on a light path between the oscillating mirror unit and the diffuser sheet.

6. The laser printing apparatus for a color dynamic image according to claim 5, wherein a size of each of the plurality of microspheres or microlenses is in a range of 20 um to 300 um, and a size of the shading layer is in a range of 20 nm to 60 nm.

7. The laser printing apparatus for a color dynamic image according to claim 5, further comprising an imaging lens group arranged on a light path between the diffuser sheet and the recording material.

8. The laser printing apparatus for a color dynamic image according to claim 5, wherein the image generator comprises a mask having a light-transmission region forming a corresponding printing graph.

* * * * *